UNITED STATES PATENT OFFICE.

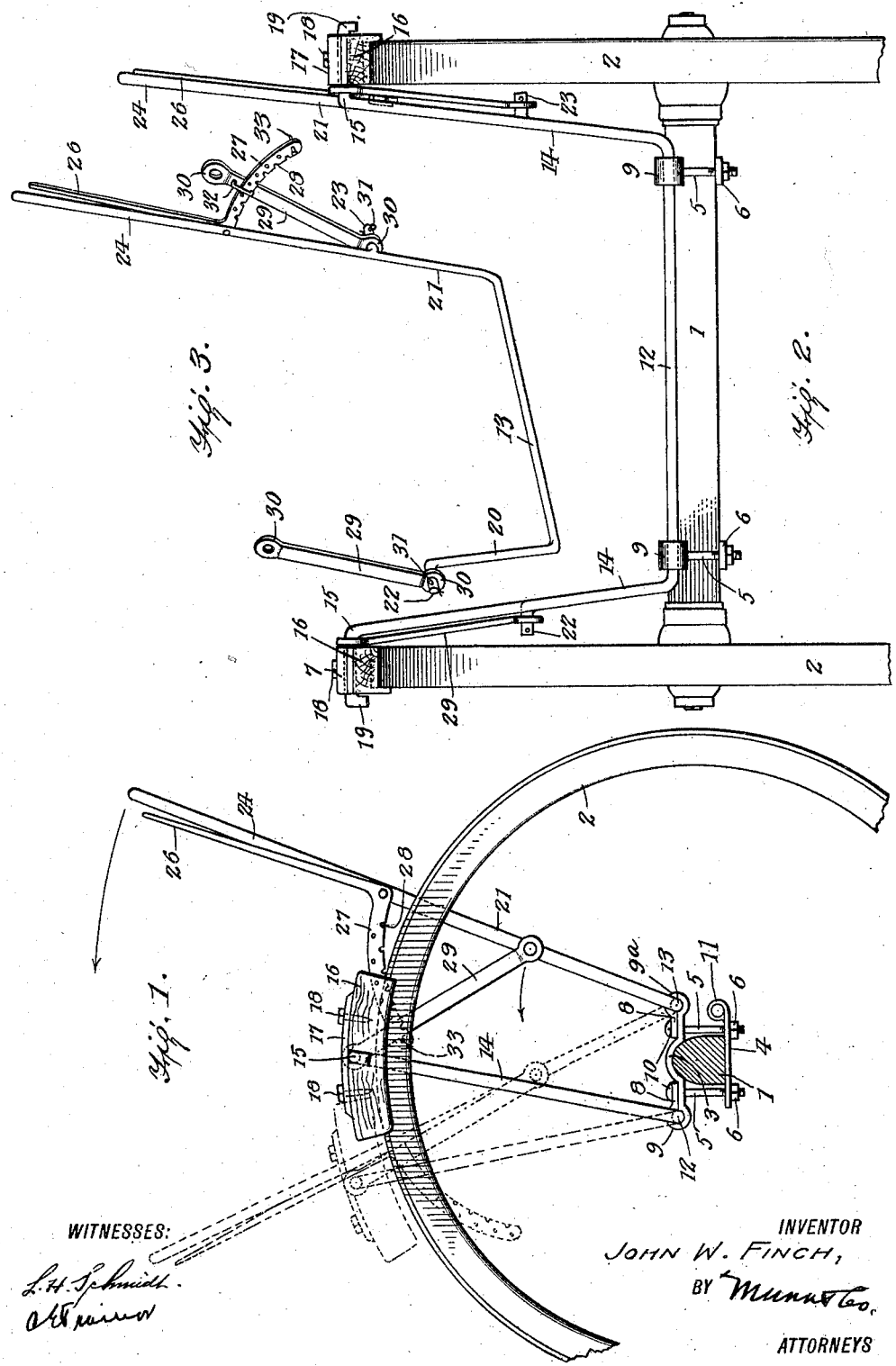

JOHN WALTER FINCH, OF BENTONIA, MISSISSIPPI.

WAGON-BRAKE.

980,621.     Specification of Letters Patent.     Patented Jan. 3, 1911.

Application filed August 17, 1910. Serial No. 577,570.

*To all whom it may concern:*

Be it known that I, JOHN W. FINCH, a citizen of the United States, residing at Bentonia, in the county of Yazoo and State of Mississippi, have invented a new and useful Improvement in Wagon-Brakes, of which the following is a specification.

My invention is an improvement in wagon brakes, and consists in certain novel constructions, and combinations of parts, hereinafter described and claimed.

The object of the invention is to provide a simple and efficient brake, connected directly to the axle and supported entirely by the running gear, so that the bed may be removed without affecting the brake, and wherein all of the brake mechanism is outside of the load line, and the capacity of the wagon will not be decreased.

Referring to the drawings forming a part hereof, Figure 1 is a side view of a portion of a wagon wheel provided with the improvement. Fig. 2 is an end view of the axle and wheels with the improvement in place, and Fig. 3 is a perspective view of the operating mechanism.

In the embodiment of the invention shown, the axle 1 of the wagon is provided with the usual wheels 2, and near each end of the axle is arranged a clip consisting of two substantially parallel bars 3 and 4, arranged one above and one below the axle, and held together on the axle by means of bolts 5. Each of the bars is provided with an opening on each side of the axle, and the bolts pass through the registering openings and are held in place by nuts 6. The upper bar 3 is curved upwardly between the openings for the bolts, at 7, to fit the upper face of the axle, and the ends of the bar are extended beyond the bolts and bent backward upon themselves at 8, to form a bearing 9, at one end of the bar, and a similar bearing 9ª at the other. The return bent portions 8 of the bar are provided with openings registering with the openings for the bolts in the body portion, and the said bolts pass through heads 10 of the bolts resting on the said return bent portions, and prevent any spreading of the bearings 9 and 9ª. The bar 4 is extended at one end, and a bearing 11 is formed in the extended end.

A shaft 12 is journaled in the bearings 9, and a shaft 13 is journaled in the bearings 9ª. The shaft 12 is provided at each end with a crank arm 14, each arm extending at somewhat more than a right angle to the shaft, to approach the rim of the wheel, and each arm is provided at its outer end with an angular portion 15, which overlies the tire of the wheel transversely.

A brake shoe 16 is journaled on the angular portion of each of the arms, the shoe having on its upper face an approximately central transverse notch or groove for receiving the angular portion, and a strap 17 is arranged longitudinally on the upper face of the shoe and transversely of the angular portion, and is secured in place by nails or screws 18. Each of the angular portions is provided with a lateral lug 19, at its free end for preventing lateral movement of the shoe.

The shaft 13 in the bearings 9ª, is provided at one end with a crank arm 20, and at the other with an arm 21. The crank arm 20 is provided at its free end with a wrist pin 22, and the arm 21, which is of greater length than the crank arm, is provided intermediate its ends with a wrist pin 23. The wrist pin 23 is at the same distance from the shaft as the wrist pin 22, and the shaft may be described as having at each end a crank arm provided with a wrist pin, one of the arms being extended beyond the wrist pin to form a handle 24.

An elbow lever is pivoted to the handle 24 at 25, and one arm 26 thereof, lies alongside the handle. The other arm 27 is arc shaped, and is provided on its under edge with a series of transverse notches 28. A link 29 is arranged adjacent to each wheel, each link having a bearing 30 at each end. One of the bearings of each link is journaled on the wrist pin of the adjacent arm 20 or 21, and the other bearing is journaled on the angular portion 15, of the adjacent crank arm 14 of the shaft 12, between the brake shoe and the arm 14. Cotter pins 31 pass through transverse openings in the wrist pins and hold the bearings 29 in place.

The link adjacent to the handle 24 is provided with a staple 32, through which the arm 27 of the elbow lever extends, and the lower end or arm of the staple is adapted for engagement by the notches to hold the handle in adjusted position. A pin 33 is arranged transversely of the end of the arm 27, to limit the movement of the handle in one direction.

In operation, when it is desired to apply the brake, the handle and arm 26 of the elbow lever are grasped in one hand, the elbow lever being thus rocked to disengage the staple arm from the notches. The handle is then free to swing and when moved into the full line position of Fig. 1, the face of the shoe is brought into contact with the tire of the wheel. When sufficiently tight, the elbow lever is released, to permit the arm 27 to drop, to engage the staple with a notch, thus holding the arm 24 with the brake applied. To release the brake, the elbow lever is again rocked to lift the arm 27, and the handle is swung into the dotted line position of Fig. 2. Since the shaft 12 is journaled behind the axle, or eccentric to the wheels, the shoe will be lifted or moved away from the center of the wheel, when the handle is swung rearwardly in the direction of the arrow in Fig. 1, and will be moved nearer to the center of the wheel when moved in the opposite direction.

The improved brake while strong and efficient, is yet light and may be cheaply constructed, and may also be applied to existing wagons, without any change whatever in the wagon. Neither will the brake decrease the capacity of the wagon, since it is outside of the load line, for which reason it cannot become jammed or blocked by the load.

I claim—

1. In combination with the axle and the wheels of a vehicle, of a clip detachably connected with the axle near each end thereof, each of said clips having a bearing on each side of the axle, a shaft journaled in the bearings on one side of the axle, said shaft having at each end an arm extending laterally and outwardly toward the rim of the adjacent wheel, and having an angular portion overlying the rim, a brake shoe journaled on each of the angular portions, a shaft journaled in the bearings on the opposite side of the axle, said shaft having a crank arm at each end, each arm having a wrist pin at the free end, a plurality of links, each pivoted at one end to the wrist pin and at the other to the angular portion of the adjacent arm of the first named shaft, one of said crank arms being extended beyond the wrist pin to form a handle, an elbow lever pivoted to the handle, one arm lying alongside the handle, and the other having a series of spaced notches on one edge, and a staple on the adjacent link, through which the arm passes.

2. In combination with the axle and the wheels of a vehicle, of a clip detachably connected with the axle near each end thereof, each of said clips having a bearing on each side of the axle, a shaft journaled in the bearings on one side of the axle, said shaft having at each end an arm extending laterally and outwardly toward the rim of the adjacent wheel, and having an angular portion overlying the rim, a brake shoe journaled on each of the angular portions, a shaft journaled in the bearings on the opposite side of axle, said shaft having a crank arm at each end, each arm having a wrist pin at its free end, a plurality of links, each pivoted at one end to wrist pin and at the other to the angular portion of the adjacent arm of the first named shaft, one of said crank arms being extended beyond the wrist pin to form a handle, and means for holding the handle in adjusted position.

3. In combination with the axle and the wheels of a vehicle, of a clip detachably connected with the axle near each end thereof, each of said clips having a bearing on each side of the axle, a shaft journaled in the bearings on one side of the axle, said shaft having at each end an arm extending laterally and outwardly toward the rim of the adjacent wheel, and having an angular portion overlying the rim, a brake shoe journaled on each of the angular portions, a shaft journaled in the bearings on the opposite side of the axle, said shaft having a crank arm at each end, one of the arms being extended to form a handle, a connection between the crank arms and the arms of the first named shaft, and means for holding the handle in adjusted position.

4. In combination with the axle and the wheels of a wagon, of a shaft journaled on each side of the axle, each of said shafts having at each end a lateral arm, a brake shoe journaled on each arm of one shaft and lying adjacent to the tire of the wheel, one of the arms of the other shaft being extended to form a handle, a connection between the arms of the shafts for simultaneously oscillating said shafts, and means for holding the handle in adjusted position.

5. In combination with the wagon, of a plurality of shafts, braking mechanism connected with one shaft, operating mechanism for the brake connected with the other shaft, a connection between the shafts, and means for detachably connecting the shafts to the axle of the wagon, said means comprising a clip for each end of the axle, each clip comprising a pair of bars adapted to be arranged one above and one below the axle, and bolts connecting the bars, one of said bars being extended on each side of the axle and provided at each end with a bearing for receiving a shaft.

JOHN WALTER FINCH.

Witnesses:
S. A. CHILDRESS,
SAM T. COWAN.